Patented Jan. 6, 1925.

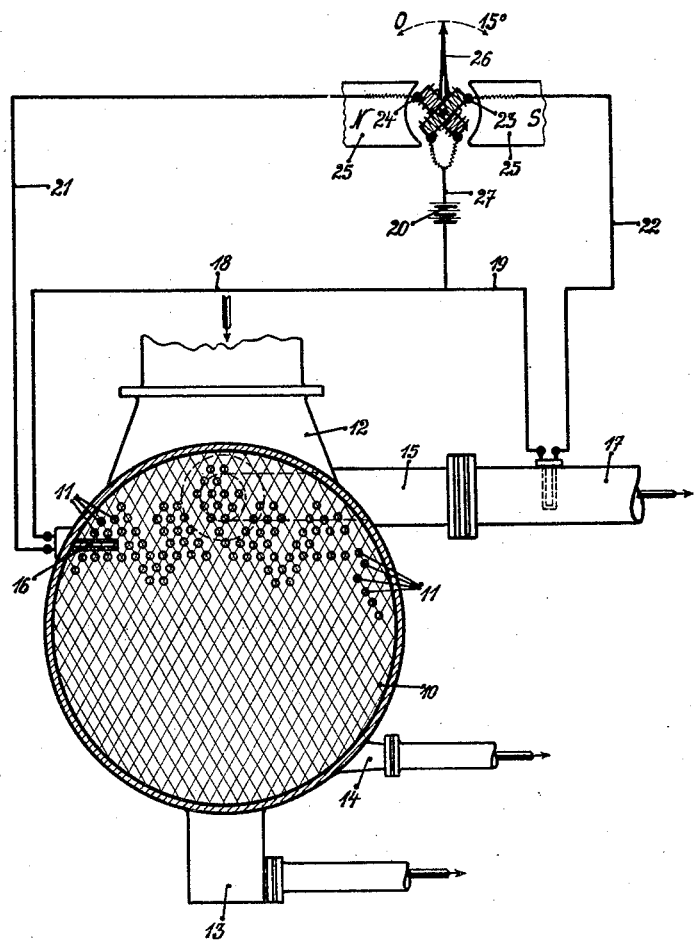

1,522,273

UNITED STATES PATENT OFFICE.

HANS RISSMANN, OF BOCHUM, GERMANY.

MEANS FOR ASCERTAINING THE EFFICIENCY OF CONDENSING PLANTS.

Application filed January 4, 1923. Serial No. 610,722.

*To all whom it may concern:*

Be it known that I, HANS RISSMANN, a citizen of Germany, residing at Bochum, Germany, have invented certain new and useful Improvements in Means for Ascertaining the Efficiency of Condensing Plants, of which the following is a specification.

My invention relates to means for ascertaining the efficiency of condensing plants by indicating the difference of temperature between the steam entering the condenser and the heated cooling water leaving it, this difference being indicative of the efficiency, and particularly when the quantity of cooling liquid and its temperature at the inlet to the condenser are of the usual magnitudes and do not too greatly vary therefrom. It has repeatedly been attempted in various manners to provide a simple and reliable measuring device, adapted to transmit the indication to a remote station. Mercury-thermometers have been employed as well as thermo-electric measuring devices.

According to the present invention, a particularly reliable indicating means of simple construction is obtained by using electric resistance thermometers which are sensitive to changes of temperature and are arranged to work after the principle of the directly indicating ohm meter. With such instruments material advantages are gained over the devices hitherto proposed.

In the drawings affixed to this specification and forming part thereof an arrangement embodying my invention is illustrated diagrammatically by way of example, the condenser being shown in transverse section.

Referring to the drawings, 10 is the condenser.

The steam to be condensed enters the condenser at 12. 11, 11 are the cooling tubes, of which but a few are shown. The condensed steam is discharged through the conduit 13, the air escapes at 14. The cooling water required to condense the steam passes through the cooling tubes 11 and leaves the condenser at 15.

A resistance thermometer 16 answering changes of temperature is inserted in the steam space of the condenser at a point where the steam, as shown by experience, is saturated, and another resistance thermometer 17 is arranged to dip into the heated cooling water. Such resistance thermometers, as is well known to those skilled in the art, consist of a piece of metal, preferably pure platinum, the resistance of which varies in proportion to the temperature. The instrument 16 is connected up by a wire 18 to a battery 20, the instrument 17 is connected to the same battery by a wire 19. Wires 21 and 22 lead to the indicating device which consists of two crosswise arranged coils 23 and 24 capable of turning in the field of a permanent magnet 25. Attached to the axle of the coils 23, 24 is a hand 26 playing in front of a suitably subdivided scale. The two coils are connected with a source of current 20 by a wire 27.

The direction of winding and the connection of the coils is so chosen that they tend to rotate in opposite directions. In proportion to the unequal heating of the resistance thermometers 16 and 17 by reason of the difference of temperature between the two points where they are disposed, the resistances in the two circuits comprising the coils differ and produce a directive force which causes the hand 26 to oscillate through a certain angle. This angle of oscillation is directly proportional to the difference of temperature which may be read off directly if the scale is suitably graduated. The graduation preferably extends from 0° to 15° C., the differences of temperature to be dealt with lying within this range.

The advantage obtained by the arrangement described is particularly notable by comparing the novel arrangement with the above-mentioned old devices in which thermo-elements are used. The problem is to comparatively measure intensities of currents, a source of current in the form of a battery being required because thermo-elements are too weak to act directly on an ampere meter. As the voltage of this source of current is variable, an exact preliminary adjustment of the service voltage must take place in every individual case, in order to obtain an accurate measurement, whereby, not only the accuracy of the measurement is impaired, but also a special operation must be gone through before the observation proper can be made, a regulating switch being required to this end.

In the present case, however, all that is necessary, is the measuring of resistances in two different circuits, the voltage of the source of current used being of no concern, whereby it is rendered possible to entirely dispense with a special regulation.

It is, therefore, in the present case, possible to determine at once the efficiency by merely reading the indicating instrument. It is true that in the case of transmission to a distance the resistances have to be adjusted first, but as, in contradistinction to the constantly changing voltage of the source of current, actually constant values are to be dealt with, only a single adjustment prior to starting the arrangement is necessary.

I wish it to be understood that I do not desire to be limited to the exact details of construction, connection and general arrangement shown and described, for obvious modifications will occur to a person skilled in the art.

I claim:

1. The combination, with a condenser, of a pair of resistance thermometers, one subjected to the temperature in the steam space and one subjected to the temperature of the cooling water near the cooling water outlet of said condenser, and means connected with said thermometers and adapted to indicate the differences of temperatures established by said thermometers.

2. The combination, with a condenser, of a pair of resistance thermometers, one subjected to the temperature in the steam space and one subjected to the temperature of the cooling water near the cooling water outlet of said condenser, and electric means connected with said thermometers and adapted to indicate the differences of temperatures established by said thermometers.

3. The combination with a condenser, of a pair of resistance thermometers, one subjected to the temperature in the steam space and one subjected to the temperature of the cooling water near the cooling water outlet of said condenser, a source of current, two circuits connected in parallel with regard to said source of current and indicating means inserted in said circuits and adapted to be influenced by one circuit in one direction and by the other in an opposite direction.

4. The combination, with a condenser, of a pair of resistance thermometers, one subjected to the temperature in the steam space and one subjected to the temperature of the cooling water near the cooling water outlet of said condenser, and a pair of cross-wise arranged coils electrically connected with said thermometers and adapted to indicate the differences of temperatures established by said thermometers.

5. The combination, with a condenser, of a pair of resistance thermometers, one subjected to the temperature in the steam space and one subjected to the temperature of the cooling water near the cooling water outlet of said condenser, a source of current, two circuits connected in parallel with regard to said source of current, a permanent magnet, a pair of cross-wise arranged coils arranged to turn in the field of said magnet, and electric connections between said thermometers, said coils, and said source of current for influencing said coils in opposite directions in proportion to the temperatures established at said thermometers.

6. The combination, with a condenser, of a pair of resistance thermometers, one subjected to the temperature in the steam space and one subjected to the temperature of the cooling water near the cooling water outlet of said condenser, a source of current, two circuits connected in parallel with regard to said source of current, a permanent magnet, a pair of cross-wise arranged coils arranged to turn in the field of said magnet, said circuits comprising said coils and said thermometers, so as to exert on said coils a turning movement in opposite directions in proportion to the difference of temperature established at said thermometers, the resistances of said circuits being so adjusted that no turning movement is exerted on said coils, if no difference of temperature arises between the two thermometers.

7. The combination with a condenser, of electrical devices responsive to temperature and subjected respectively to the temperature in the steam space of said condenser and to the temperature of the cooling water of said condenser near the cooling water outlet, and an indicating instrument controlled by said temperature-responsive devices jointly and so arranged as to produce indications dependent upon the difference between the temperatures to which said temperature-responsive devices are subjected.

8. The combination with a condenser, of electrical devices responsive to temperature and subjected respectively to the temperature in the steam space of said condenser and to the temperature of the cooling water of said condenser near the cooling water outlet, an indicating instrument comprising crossed coils and a magnetic field therefor, and connections between said temperature-responsive devices and said coils of such character that the extent of relative movement between said coils and field is indicative of the magnitude of the difference between the temperatures to which said temperature-responsive devices are subjected.

In testimony whereof I affix my signature.

HANS RISSMANN.